United States Patent
Yeh

(10) Patent No.: US 9,952,488 B2
(45) Date of Patent: Apr. 24, 2018

(54) PROJECTOR

(71) Applicant: HON HAI PRECISION INDUSTRY CO., LTD., New Taipei (TW)

(72) Inventor: Chin-Wen Yeh, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 148 days.

(21) Appl. No.: 14/821,289

(22) Filed: Aug. 7, 2015

(65) Prior Publication Data

US 2017/0003581 A1    Jan. 5, 2017

(30) Foreign Application Priority Data

Jun. 30, 2015    (CN) ............ 2015 2 0472974 U

(51) Int. Cl.
    *G03B 21/20*      (2006.01)
    *G03B 21/16*      (2006.01)
    *G03B 21/14*      (2006.01)

(52) U.S. Cl.
    CPC ........... *G03B 21/20* (2013.01); *G03B 21/145* (2013.01); *G03B 21/16* (2013.01)

(58) Field of Classification Search
    CPC ...... G03B 21/16; G03B 21/20; G03B 21/145; G03B 21/2093; H04N 9/3144
    See application file for complete search history.

(56) References Cited

U.S. PATENT DOCUMENTS

| | | | |
|---|---|---|---|
| 2003/0063464 A1* | 4/2003 | Gulliksen | ............... F21V 29/02 362/294 |
| 2009/0103055 A1* | 4/2009 | Sun | ........................ G03B 21/20 353/52 |
| 2009/0225282 A1* | 9/2009 | Matsumiya | ........ G03B 21/2093 353/85 |
| 2012/0092877 A1* | 4/2012 | Minami | ............. G03B 21/2046 362/362 |
| 2014/0104585 A1* | 4/2014 | Kadotani | ........... G03B 21/2033 353/119 |

* cited by examiner

*Primary Examiner* — Christina Riddle
*Assistant Examiner* — Christopher Lamb, II
(74) *Attorney, Agent, or Firm* — ScienBiziP, P.C.

(57) ABSTRACT

A projector includes a base, a light module secured on the base, and a cover secured on the light module. The light module includes a bracket, and the cover includes two securing members. The bracket and the securing members define a plurality of through holes to reduce the weight of the bracket and the through holes. The securing member is equipped with a hook, and the hook is elastically deformed to be engaged with the bracket.

10 Claims, 5 Drawing Sheets

PROJECTOR

CROSS-REFERENCE TO RELATED APPLICATIONS

This application claims priority to Chinese Patent Application No. 201520472974.X filed on Jun. 30, 2015, the contents of which are incorporated by reference herein.

FIELD

The subject matter herein generally relates to electronic devices, and more particularly to a projector.

BACKGROUND

A projector generally includes an enclosure and a plurality of electronic components, such as a light module, within the enclosure. The light module is secured to the enclosure by screws.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
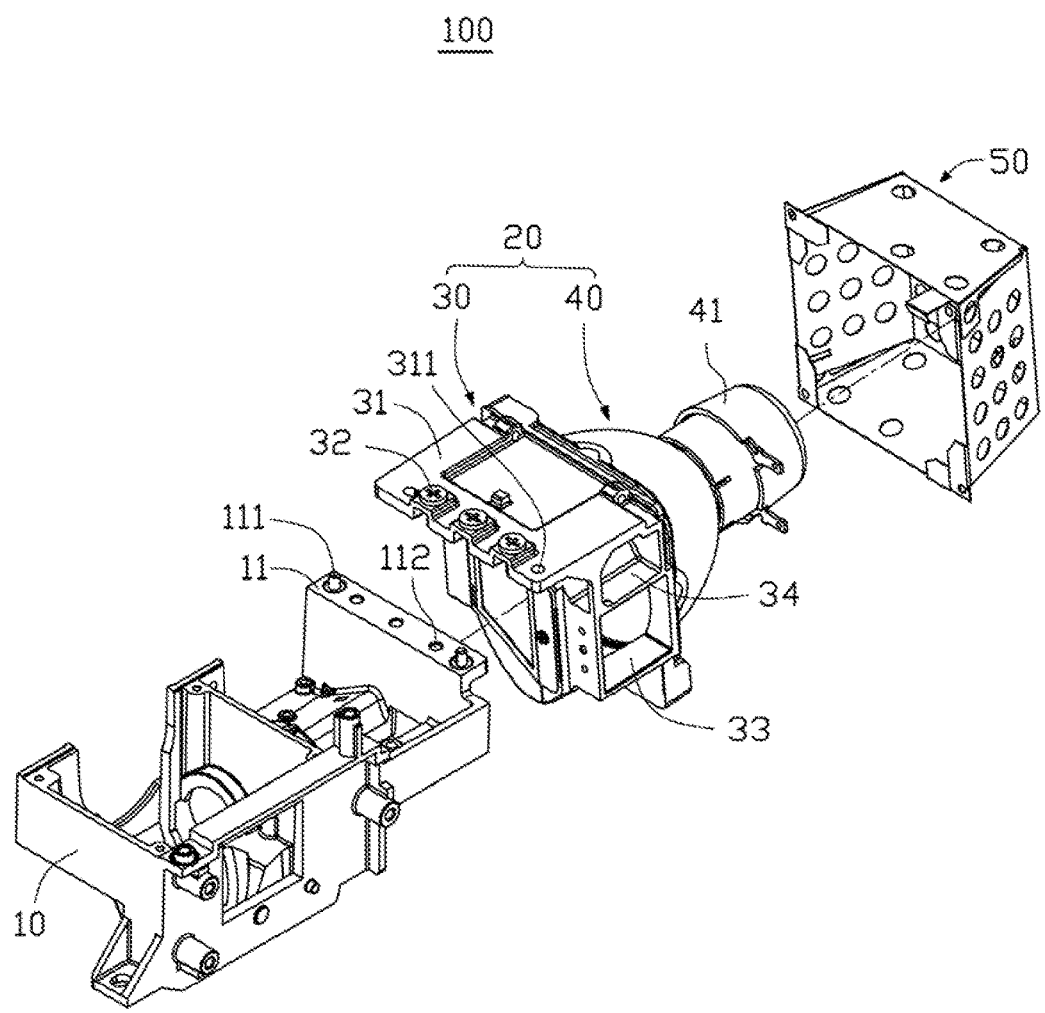
FIG. 1 is an isometric, exploded view of an embodiment of a projector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates one embodiment of a projector 100. The projector 100 includes a shell (not shown), a base 10 received in the shell, a light module 20 configured to be secured on the one end of the base 10, and a cover 50 configured to be secured on the light module 20.

An end of the base 10 is equipped with a securing portion 11. Each end of the securing portion 11 is equipped with a positioning column 111. The securing portion 11 defines a plurality of securing holes 112 between the two positioning columns 111.

Figure 2:
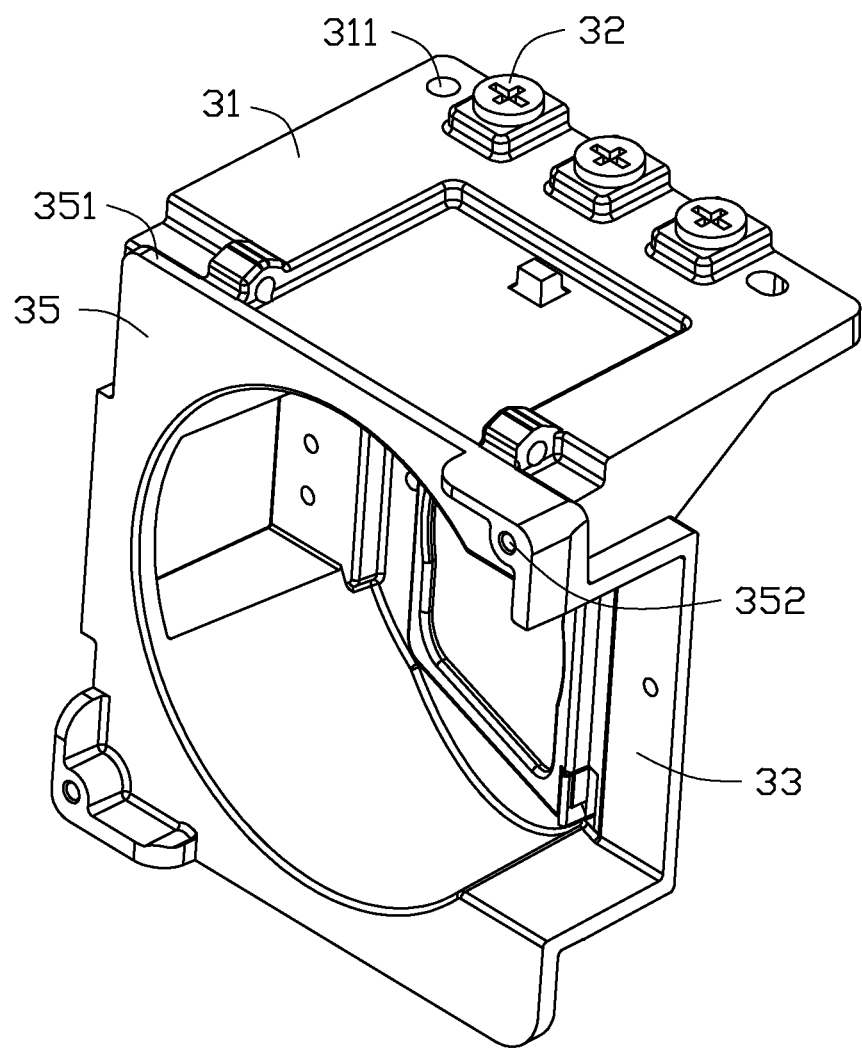
FIG. 2 is an isometric, exploded view of a bracket of FIG. 1.

FIGS. 1 and 2 illustrate that the light module 20 includes a bracket 30 and a light emitting device 40 configured to be secured on the bracket 30.

An end of the bracket 30 is equipped with a securing plate 31. The securing plate 31 defines two positioning holes 311, and the positioning column 111 is configured to be inserted into the positioning hole 311. The securing plate 31 defines a plurality of punch outs (not shown) between the two positioning holes 311. A plurality of fasteners 32 are configured to pass through the punch outs and be inserted into the securing holes 112. Each side of the bracket 30 defines an air vent 33 configured to cool the light emitting device 40 as the passing airflow takes heat away from the light emitting device 40. The bracket 30 defines a through hole 34 above one of the two air vents 33. The through hole 34 reduces the weight of the bracket 30.

Another end of the bracket 30 is equipped with a connecting plate 35. One of two diagonals of the connecting plate 35 includes two latching portions 351 and the other of the two diagonals defines two securing holes 352. The light emitting device 40 includes a connecting portion 41. The cover 50 is configured to be attached on the connecting portion 41 and be secured on the connecting plate 35.

Figure 3:
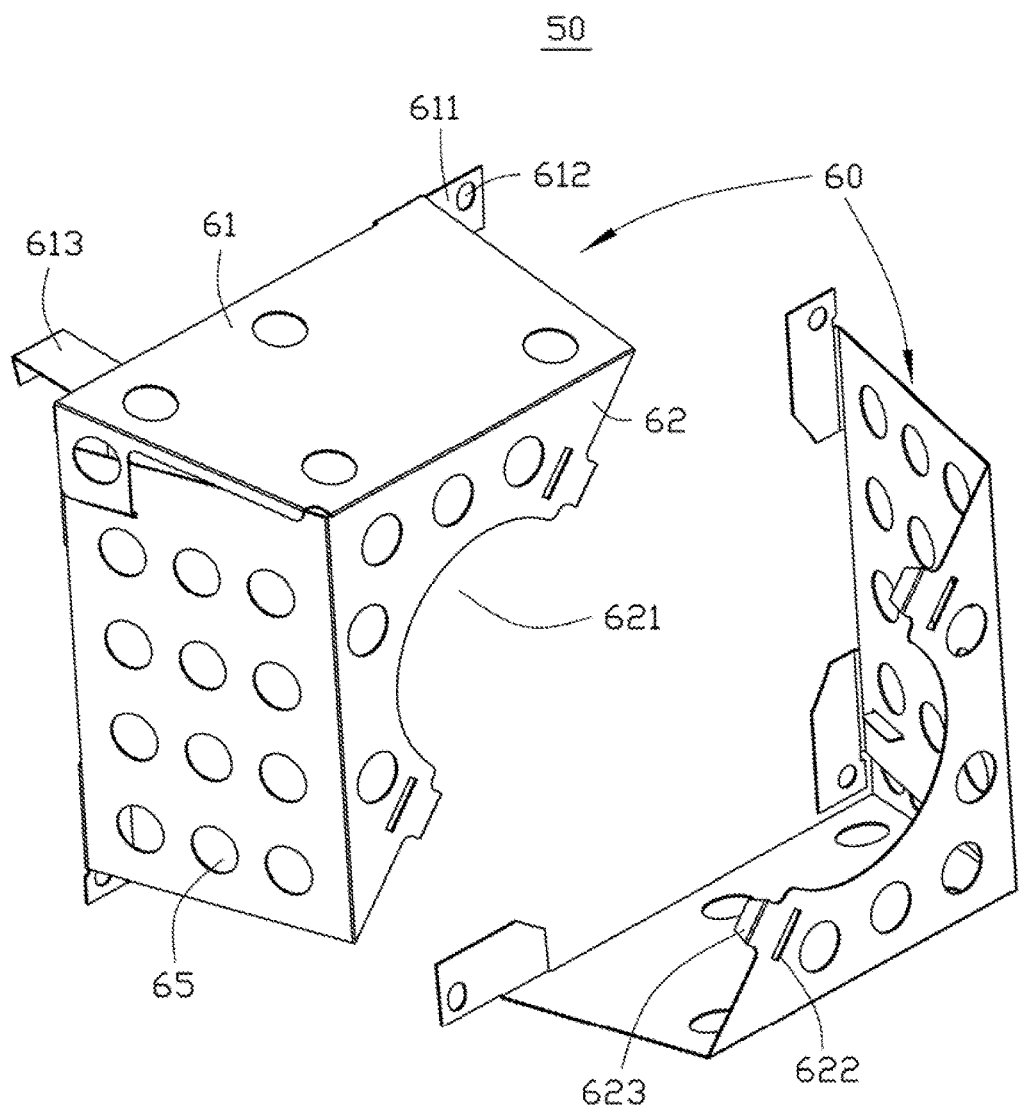
FIG. 3 is an isometric, exploded view of a cover of FIG. 1.

FIG. 3 illustrates that the cover 50 includes two securing members 60. The shapes of the two securing members 60 are substantially the same as each other. Each securing member 60 includes two stopper plates 61 and a latching piece 62. The stopper plates 61 and the latching piece 62 define a plurality of through holes 65 to reduce the weight of the securing member 60. A bent piece 611 is located on the bottom edge of the stopper plate 61. The bent piece 611 defines a limiting hole 612, and a plurality of fixing members (not shown) is configured to pass through the limiting holes 612.

A hook 613 is located at the joint of the two stopper plates 61. The hook 613 can be elastically deformed to be engaged with the latching portion 351. A cutout 621 is defined in each latching piece 62, and the connecting portion 41 of the light emitting device 40 is configured to be received between the two cutouts 621. A latching hole 622 is defined in each latching piece 62 and is equipped with a resilient piece 623 at each side of the cutout 621. The resilient piece 623 of one of the latching pieces 62 can be engaged with the latching hole 622 of another latching piece 62.

Figure 4:
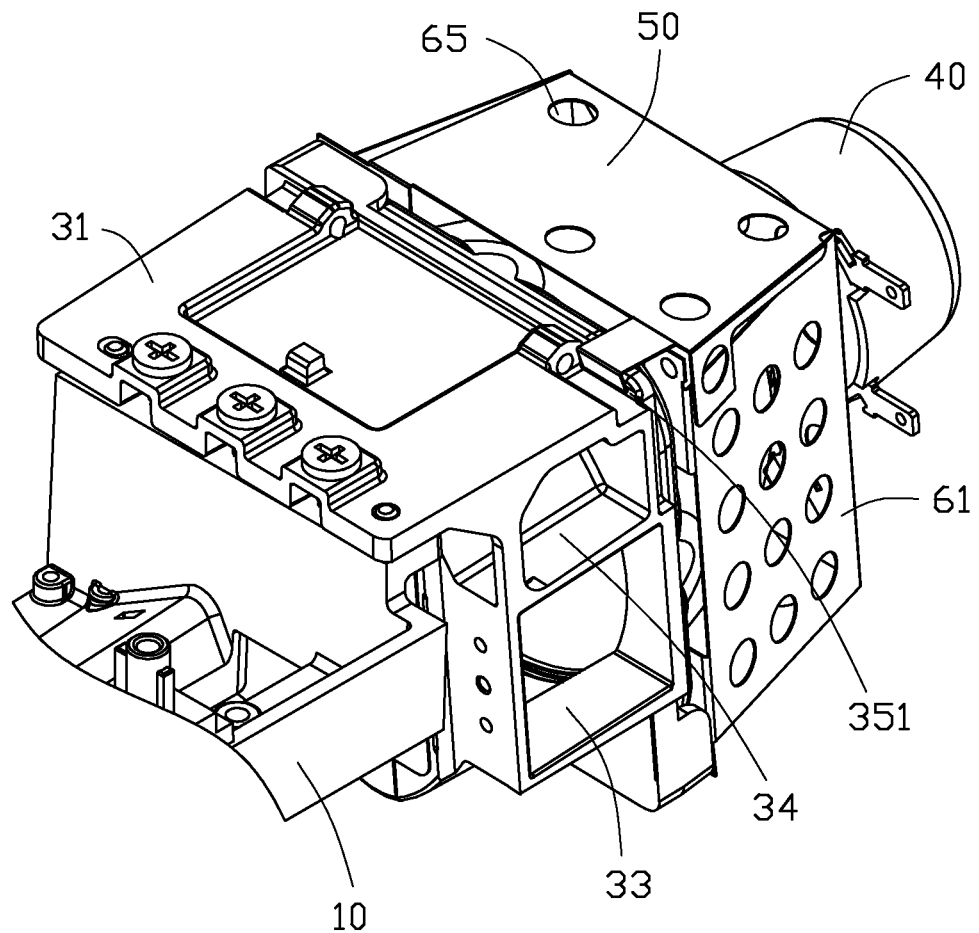
FIG. 4 is a partial isometric, assembled view of the projector of FIG. 1.
Figure 5:
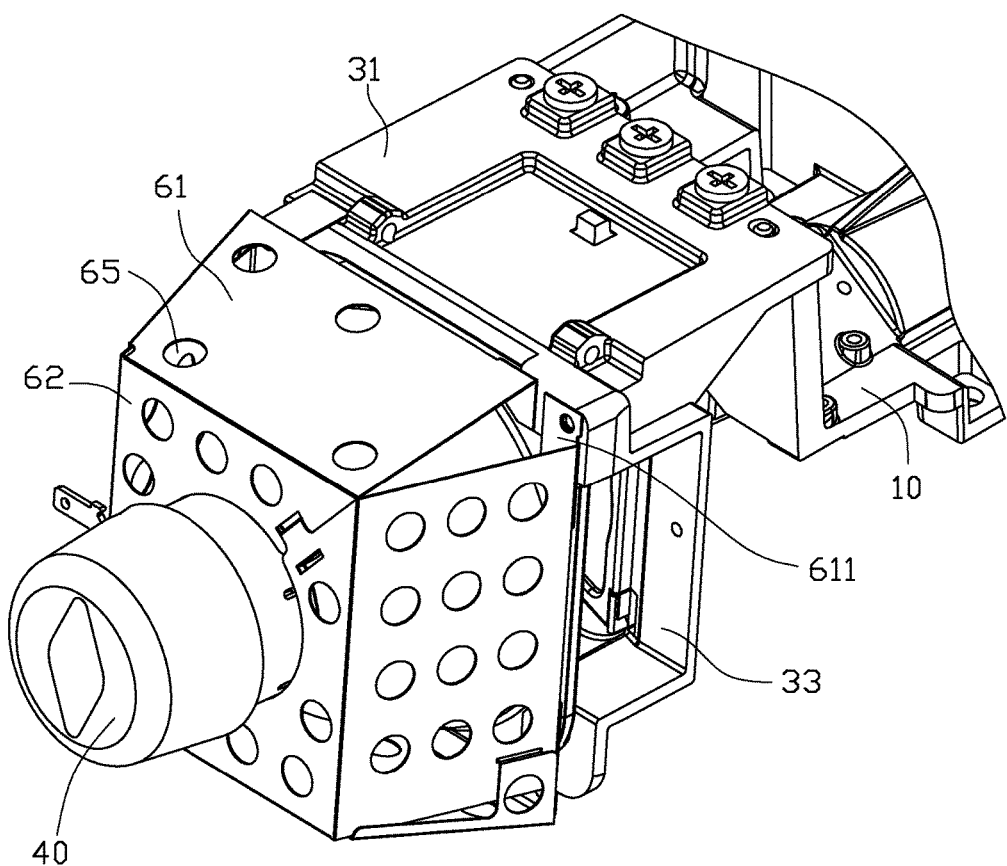
FIG. 5 is similar to the FIG. 4, but viewed from another angle.

FIGS. 4 and 5 illustrate when in assembly, the light emitting device 40 is secured on the bracket 30. The securing plate 31 is placed on the securing portion 11 of the base 10. The positioning columns 111 are inserted into the positioning holes 311 to align the punches with the securing holes 112. The fasteners 32 pass through the punches to be inserted into the securing holes 112 to secure the light module 20 on the base 10.

The two securing members 60 are placed on the light module 20. The connecting portion 41 of the light emitting device 40 is received between the two cutouts 621. The resilient piece 623 of one latching piece 62 is engaged with the latching hole 622 of another latching piece 62. The bent piece 611 is attached on the connecting plate 35 of the bracket 30, and the limiting holes 612 are aligned with the securing holes 352. The fixing members pass through the limiting holes 612 to be inserted into the securing holes 352. The hook 613 is elastically deformed to be engaged with the latching portion 351 to secure the securing member 60 on the light module 20. Then, the projector 100 is completely assembled.

The embodiments shown and described above are only examples. Many details are often found in the art such as the other features of a projector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A projector comprising:
a base;
a light module secured on the base and comprising a bracket defining a plurality of through holes; and
a cover secured on the light module and comprising two securing members each comprising a hook configured to be elastically deformed to be engaged with the bracket and defining a plurality of through holes;
wherein the plurality of through holes of the light module and the plurality of through holes of the securing members reduce the weight of the bracket and the securing members and increase the cooling efficiency of the projector, each securing member comprises two stopper plates connected with each other, and the hook is located at a joint of each of the two stopper plates, the bracket further comprises a connecting plate, the connecting plate comprises two diagonals, one of the two diagonals of the connecting plate comprises two latching portions, and the hooks being elastically deformable to engage with the latching portions, a bent piece is located on a bottom edge of at least one of the stopper plates, the bent piece defines a limiting hole, another portion of the connecting plate defines two securing holes, and a single fixing member of a plurality of fixing members can pass through the limiting hole to be inserted into the securing holes, each securing member comprises a latching piece, at least one of the latching pieces defines a cutout, the light module comprises a connecting portion, and the connecting portion is received within the cutouts, each of the latching pieces defines a latching hole and is equipped with a resilient piece at each side of the cutout, the resilient piece of one of the latching pieces can engage with the latching hole of another latching piece.

2. The projector of claim 1, wherein one end of the base comprises a securing portion, and the bracket is secured on the securing portion.

3. The projector of claim 2, wherein each side of the securing portion is equipped with a positioning column, the bracket comprises a securing plate defining two positioning holes, and the positioning column is configured to be inserted into each of the positioning holes.

4. The projector of claim 3, wherein the securing portion defines a plurality of securing holes between the positioning columns, the securing plate defines a plurality of punches, and a plurality of fasteners can pass through the punches to be inserted into the securing holes.

5. The projector of claim 1, wherein the bracket defines an air vent, and the air vent is configured to allow the airflow passing to cool the light module.

6. A projector comprising:
a base;
a light module secured on the base and comprising a bracket, which comprising two latching portions; and
a cover secured on the light module and comprising two securing members, each securing member comprising two stopper plates and a hook extending from the two stopper plates;
wherein the bracket and the securing members define a plurality of through holes to reduce the weight of the bracket and the securing members and increase the cooling efficiency of the projector, the hook is elastically deformed to be engaged with the latching portions of the bracket, the two stopper plates are connected with each other, and the hook is located at a joint of each of the two stopper plates, the bracket further comprises a connecting plate, the connecting plate comprises two diagonals, the two latching portions are located on one of the two diagonals of the connecting plate, and the hooks are elastically deformable to engage with the latching portion, a bent piece is located on a bottom edge of at least one of the stopper plates, the bent piece defines a limiting hole, another portion of the connecting plate defines two securing holes, and a single fixing member of a plurality of fixing members can pass through the limiting hole to be inserted into the securing holes, each securing member comprises a latching piece, at least one of the latching pieces defines a cutout, the light module comprises a connecting portion, and the connecting portion is received within the cutout, each of the latching pieces defines a latching hole and is equipped with a resilient piece at each side of the cutout, the resilient piece of one of the latching pieces can engage with the latching hole of another latching piece.

7. The projector of claim 6, wherein one end of the base comprises a securing portion, and the bracket is secured on the securing portion.

8. The projector of claim 7, wherein each side of the securing portion is equipped with a positioning column, the bracket comprises a securing plate defining two positioning holes, and the positioning column is configured to be inserted into each of the positioning holes.

9. The projector of claim 8, wherein the securing portion defines a plurality of securing holes between the positioning columns, the securing plate defines a plurality of punches, and a plurality of fasteners can pass through the punches to be inserted into the securing holes.

10. The projector of claim 6, wherein the bracket defines an air vent, and the air vent is configured to allow the airflow passing to cool the light module.

* * * * *